United States Patent
Chauhan et al.

(10) Patent No.: US 12,547,314 B2
(45) Date of Patent: Feb. 10, 2026

(54) CONFIGURABLE AND EVENT DRIVEN SMART HYBRID CLOUD ORCHESTRATOR

(71) Applicant: American Express Travel Related Services Company, Inc., New York, NY (US)

(72) Inventors: Umesh Singh Chauhan, Phoenix, AZ (US); Ashok Nair, Phoenix, AZ (US); Man Chon U, Sunrise, FL (US); Phanikalyan Cherkuri, Chandler, AZ (US); Dheeraj Sodani, Phoenix, AZ (US); Pratap Singh Rathore, Phoenix, AZ (US); Sulabh Shukla, Phoenix, AZ (US); Kalidas Ganesh, Bengaluru (IN)

(73) Assignee: American Express Travel Related Services Company, Inc., New York, NY (US)

( * ) Notice: Subject to any disclaimer, the term of this patent is extended or adjusted under 35 U.S.C. 154(b) by 218 days.

(21) Appl. No.: 18/350,281

(22) Filed: Jul. 11, 2023

(65) Prior Publication Data
US 2025/0021225 A1    Jan. 16, 2025

(51) Int. Cl.
*G06F 3/06* (2006.01)
(52) U.S. Cl.
CPC .......... *G06F 3/0605* (2013.01); *G06F 3/0631* (2013.01); *G06F 3/067* (2013.01)

(58) Field of Classification Search
CPC ....... G06F 3/0605; G06F 3/0631; G06F 3/067
See application file for complete search history.

(56) References Cited

U.S. PATENT DOCUMENTS

| | | | |
|---|---|---|---|
| 2022/0004428 A1* | 1/2022 | Sun | G06F 9/4875 |
| 2023/0105147 A1* | 4/2023 | Westerhoff | G06F 16/183 709/217 |
| 2023/0196237 A1* | 6/2023 | Ratnapuri | H04L 67/51 705/7.25 |

* cited by examiner

*Primary Examiner* — Hiep T Nguyen
(74) *Attorney, Agent, or Firm* — Thomas | Horstemeyer, LLP

(57) ABSTRACT

Disclosed are various embodiments for configurable and event driven smart hybrid cloud orchestrators. Various embodiments include a first computing device that can receive a request that includes various configurations to perform one or more actions. The first computing device can generate machine-readable instructions to perform a first action. The first computing device can send a first event to an event hub that includes the machine-readable instructions. The second computing device can receive the first event from the event hub and provision computing resources. The second computing device can then modify the machine-readable instructions based on the computing resources and then execute the machine-readable instructions. The second computing device can send a second event indicating that the first action has completed. The first computing device can receive the second event from the event hub.

20 Claims, 4 Drawing Sheets

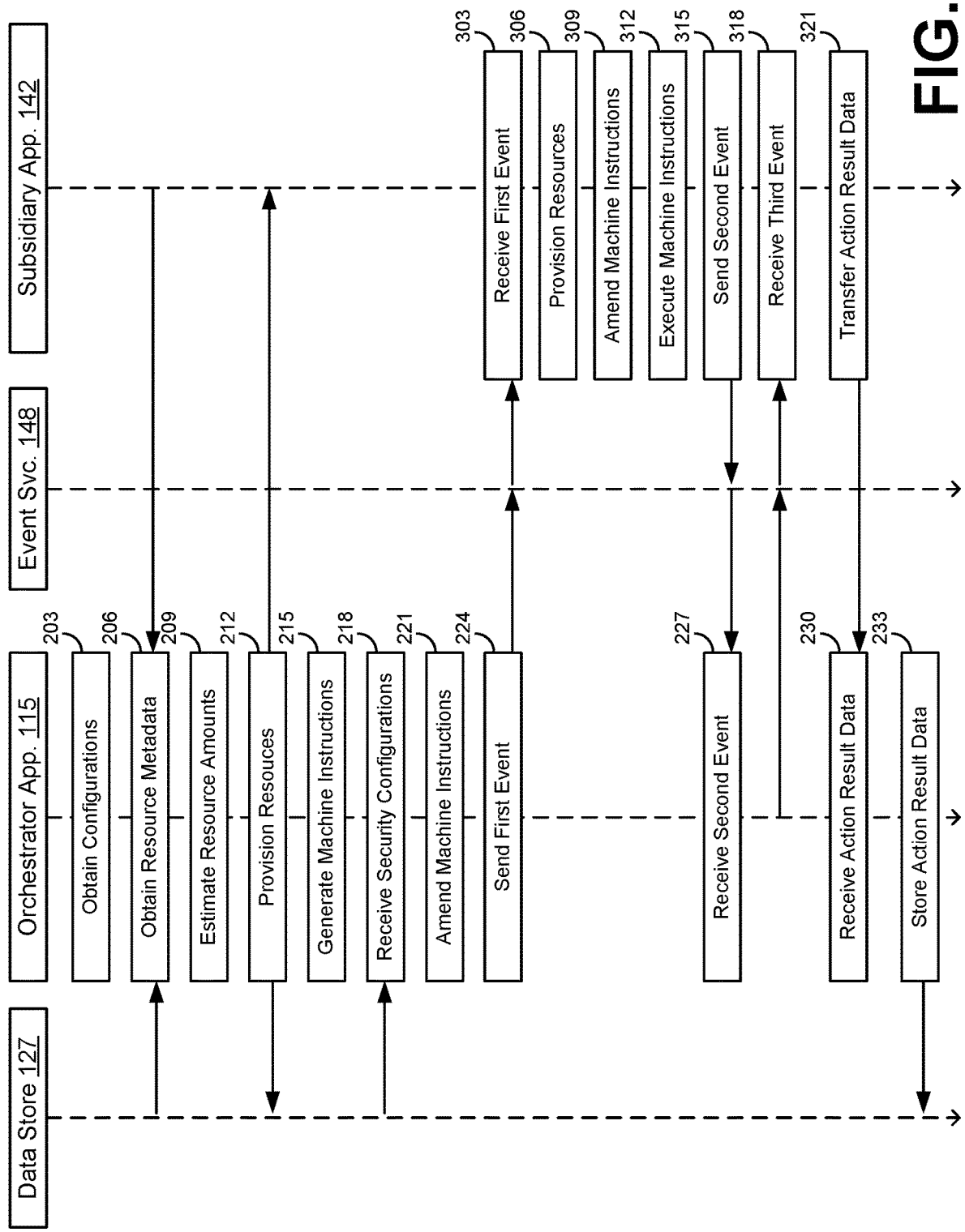

CONFIGURABLE AND EVENT DRIVEN SMART HYBRID CLOUD ORCHESTRATOR

BACKGROUND

Organizations are moving more data than ever from their data servers into cloud environments, but the transition to move all an organization's data to the cloud can often take a long time due to legal compliance and corporate regulations. Additionally, software developers often try to build resilient systems and require large amounts of testing data to verify their systems. However, it is often difficult for organizational representatives and software developers to obtain the necessary data from various environments for use with their systems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a sequence diagram illustrating one example of functionality implemented as in the network environment of FIG. 1 according to various embodiments of the present disclosure.

DETAILED DESCRIPTION

Disclosed are various approaches for making and using a configurable and event driven smart hybrid cloud orchestrator. Organizational representatives and software developers often need to perform one or more actions to obtain data from various environments, such as a cloud environment or an on-premises environment. Such data could be used for various purposes, like for generating reports for business purposes, collecting big data to perform various business actions, and/or performing various unit tests. Each environment can utilize various different technologies, which can be overwhelming to coordinate for those who want to obtain data or perform certain calculations on the data.

Accordingly, a configurable and event driven smart hybrid cloud orchestrator can be utilized to abstract the process for the software developer or the organizational representative. Such an orchestrator can trigger the execution of various sub-processes that can be performed on the various subsidiary environments. The subsidiary environments can determine the necessary environment specific details, like determining whether the data source in an environment stores its data in a Hadoop cluster, a relational database, a non-relational database, or any other structure, to the subsidiary environment itself. Additionally, because the data can be spread over multiple environments, it can be difficult for software developers or everyday people to automate a process of retrieving the necessary data or performing various actions in a specified order. Accordingly, a configurable and event driven smart hybrid cloud orchestrator allows for a scalable, asynchronous task execution without overly complicated programming.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
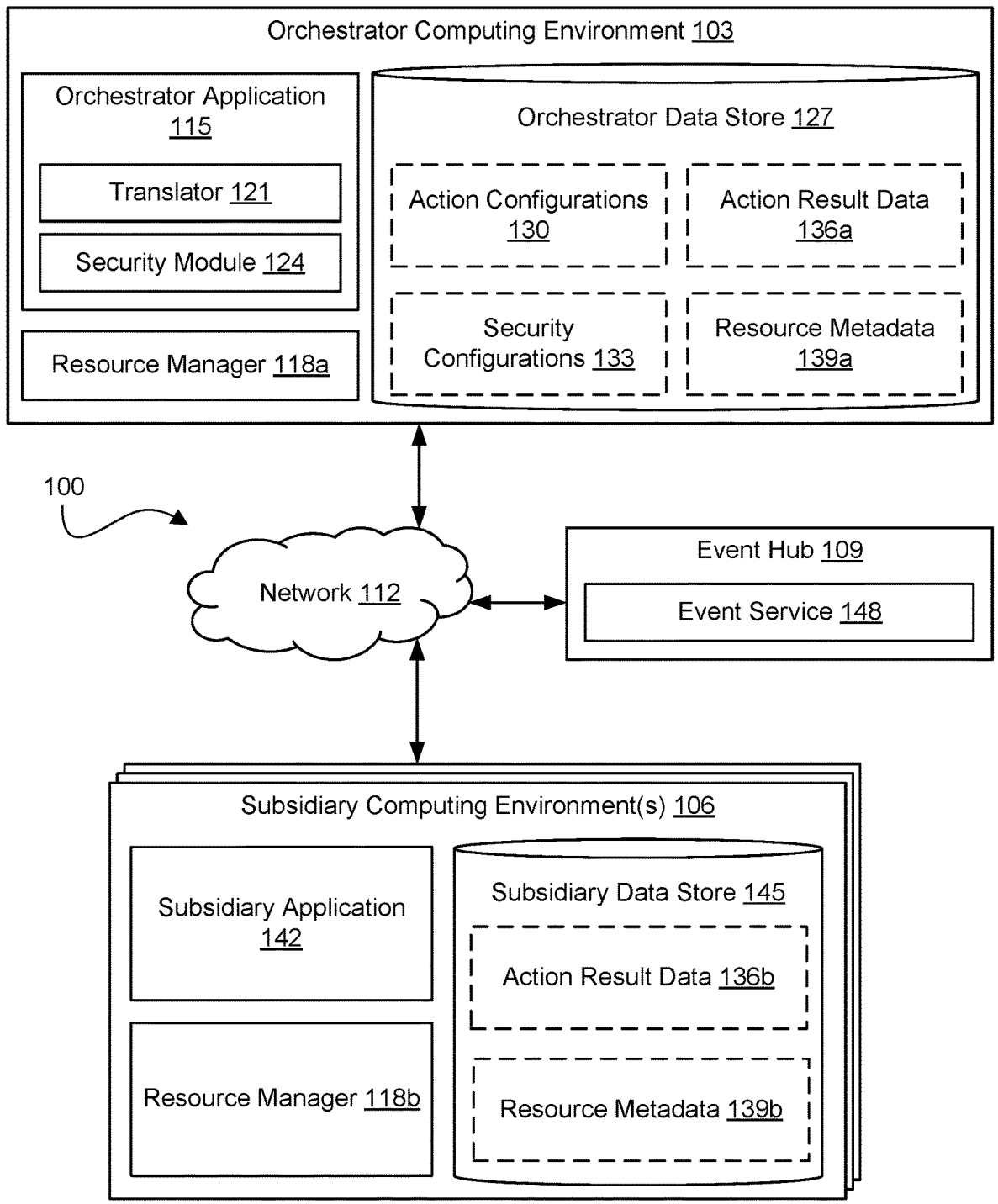
FIG. 1 is a drawing of a network environment according to various embodiments of the present disclosure.

With reference to FIG. 1, shown is a network environment 100 according to various embodiments. The network environment 100 can include an orchestrator computing environment 103, subsidiary computing environment(s) 106, an event hub 109, which can be in data communication with each other via a network 112.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The orchestrator computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the orchestrator computing environment 103 can employ a plurality of computing devices that can be arranged in one or more server banks or computer banks or other arrangements. Such computing devices can be located in a single installation or can be distributed among many different geographical locations. For example, the orchestrator computing environment 103 can include a plurality of computing devices that together can include a hosted computing resource, a grid computing resource, or any other distributed computing arrangement. In some cases, the orchestrator computing environment 103 can correspond to an elastic computing resource where the allotted capacity of processing, network, storage, or other computing-related resources can vary over time.

Various applications or other functionality can be executed in the orchestrator computing environment 103. The components executed on the orchestrator computing environment 103 include an orchestrator application 115 and a resource manager 118a (generically as "resource manager 118"), and other applications, services, processes, systems, engines, or functionality not discussed in detail herein.

The orchestrator application 115 can be executed to obtain action configurations 130 to perform one or more actions and orchestrate the corresponding performance thereof on one or more subsidiary computing environments 106. The orchestrator application 115 can obtain action configurations 130 in the form of at least a file or data request parameters. In at least one embodiment, a client device (not shown) can send the orchestrator application 115 a request to perform the one or more actions listed in a file representing the action configurations 130 included within the request. In at least another embodiment, a client device (not shown) can send the orchestrator application 115 a request to perform the one or more actions based on action configurations 130 contained within the header or body of the request. The orchestrator application 115 can also be executed to communicate with the resource manager 118 to ensure that there are sufficient computing resources to perform the one or more actions. The orchestrator application 115 can also be executed to obtain data from the orchestrator data store 127. The orchestrator application 115 can also generate machine-readable instructions representative of at least one of the one or more actions that can be performed on at least the orchestrator computing environment 103 or one or more of the subsidiary computing environments 106. Various examples of the functionality that can be performed by the orchestrator application 115 will be further discussed in the discussion of FIG. 2.

The orchestrator application 115 can include one or more modules such as a translator 121 and a security module 124. The translator 121 is a module of an orchestrator application 115 that can interpret action configurations 130 to generate machine-readable instructions that are representative of the one or more actions to be performed. The translator 121 is primarily responsible for converting the action configurations 130 into machine-readable instructions or machine-readable code that can be executed by a computing device. In at least one embodiment, the translator 121 can generate a single set of machine-readable instructions to perform all of the one or more actions defined by the action configurations 130. In at least another embodiment, the translator 121 can generate more than one sets of machine-readable instructions, each set performing one or more of the actions defined by the action configurations 130. As a module, the translator 121 can be expanded to translate new styles of action configurations 130 merely by including additional translator 121 modules. The orchestrator application 115 can utilize the translator 121 during the execution to generate machine-readable instructions to perform the one or more actions. Additional information on how the orchestrator application 115 utilizes the translator 121 will be further addressed in the discussion of FIG. 2.

The security module 124 is a module of the orchestrator application 115 that can detect when machine-readable instructions lack the necessary security requirements for a specific environment, such as the orchestrator computing environment 103 or a subsidiary computing environment 106. Additionally, the security module 124 can inject, amend, or otherwise modify machine-readable instructions to include additional security instructions to ensure that the security parameters of the security configurations 133 are met. For example, the security module 124 can inject, amend, or modify code to at least ensure secure passwords are used, secure keys and/or secure certificates are used to encrypt/decrypt data, database lock mechanisms are utilized to ensure safe retrieval of data, and various other security actions. Often, security requirements can be set by law (e.g., HIPAA, PCI DSS, etc.). In other instances, a business can provide its own sets of security rules to ensure data security. Either having been set by law or by an organization, the security module 124 can ensure that the machine-readable instructions will be compliant upon execution of the machine-readable instructions by injecting, amending, or otherwise modifying the machine-readable instructions. The orchestrator application 115 can utilize the security module 124 during the execution to detect when the machine-readable instructions fail to meet security requirements for a computing environment and inject, amend, or modify the machine-readable instructions to ensure the security requirements for the computing environment are met. Additional discussion of how the orchestrator application 115 utilizes the security module 124 will be further discussed in the discussion of FIG. 2.

The resource manager 118 can be executed to estimate the amount of computing resources to be utilized by the one or more actions defined by the action configurations 130. The resource manager 118 can receive and/or obtain resource metadata 139 from a computing environment (e.g., the resource metadata 139a from the orchestrator computing environment 103, the resource metadata 139b from the subsidiary computing environments 106, etc.). Using the resource metadata 139 and the action configurations 130, the resource manager 118 can estimate an amount of resources that a computing environment (e.g., the orchestrator computing environment 103, a subsidiary computing environment 106, etc.) will need to use to perform the action. The resource manager 118 can also provision and/or allocate a computing resource on the computing environment that the resource manager 118 is running. Computing resources can include memory, processors, data storage (e.g., hard drive, solid-state drive, Universal Serial Bus (USB) flash drive, memory card, etc.), network devices, or various other computer components that can be used to execute machine-readable instructions, store the result of the machine-readable instructions, and/or transfer the result of the machine-readable instructions. Additional discussion of how the use of the resource manager 118 will be further discussed in the discussion of FIG. 2.

Also, various data is stored in an orchestrator data store 127 that is accessible to the orchestrator computing environment 103. The orchestrator data store 127 can be representative of a plurality of orchestrator data stores 127, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the orchestrator data store 127 is associated with the operation of the various applications or functional entities described in this disclosure. This data can include action configurations 130, security configurations 133, action result data 136a (generically as "action result data 136"), resource metadata 139a (generically as "resource metadata 139"), and potentially other data.

The action configurations 130 can represent a workflow of one or more actions that can be performed over various computing environments. In at least one embodiment, the action configurations 130 can be stored as a JavaScript Object Notation (JSON) file. In at least another embodiment, the action configurations 130 can be stored as an Extensible Markup Language (XML) file. Various files and formats for the action configurations 130 can also be used.

The action configurations 130 function as a "no-code" way to instruct various computing environments to perform one or more actions to yield action result data 136. By "no-code," it should be understood that a user will merely provide configuration information and the combination of the orchestrator application 115, the event service 148, and the subsidiary computing environment(s) 106 can execute the actions without code being provided in the action configurations 130. For example, the action configurations 130 can include an action that would select information as action result data 136 from a secure database held on the premises. The action could also transfer the action result data 136 from the secure database held on the premises on a first subsidiary computing environment 106 to a database in the cloud on a second subsidiary computing environment 106. In another example, the action configurations 130 can include an action that would perform calculations on large data sets and return the action result data 136. In some embodiments, the actions in the action configurations 130 could be unaware of which subsidiary computing environment 106 stores certain data or can perform certain calculations. In such embodiments, the translator 121 can determine which subsidiary computing environment 106 would be responsible for performing the action.

The security configurations 133 can represent rules or procedures to ensure that data remains secure during the performance of the actions. In at least one embodiment, the action configurations 130 can be stored as a JavaScript Object Notation (JSON) file. In at least another embodiment, the action configurations 130 can be stored as an Extensible Markup Language (XML) file. Various files and formats for the action configurations 130 can also be used. The security configurations 133 can be used by the security module 124 to determine which portions of the machine-readable instructions need to be modified to bring the machine-readable instructions into compliance with the legal standards or corporate regulations.

The action result data 136 can represent the result of performing one or more actions defined by the action configurations 130. The action result data 136 can be calculated data or data stored on a subsidiary computing environment 106. The action result data 136 can be transferred by a subsidiary application 142 to another computing environment, such as the orchestrator computing environment 103 and/or a subsidiary computing environment 106.

The resource metadata 139 can represent information about the computing resources that are accessible to a computing environment (e.g., the orchestrator computing environment 103, a subsidiary computing environment 106, etc.). For example, the resource metadata 139 can identify an operating system of the computing environment, the file system, and/or the available services. In at least some embodiments, the resource metadata 139 can also include hardware or virtualized hardware accessible to the computing environment, such as a memory, processors, data storage devices (e.g., disk drives, solid state drives, etc.), network adapters, and various other hardware or virtualized hardware. Additionally, the resource metadata 139 can also include various information about the utilization of any of the aforementioned computing resources. For example, the resource metadata 139 can identify the utilization amount of a hard drive that is allocated for a relational database or another service. In another example, the resource metadata 139 can include the average processor utilization amounts for the computing environment. Additionally, the resource metadata 139 can also include minimum data size allocation information to store a specific data type. For example, the resource metadata 139 can include information that identifies that each user requires a minimum of five kilobytes of data storage to be allocated to ensure the data transfer will complete. Various applications, such as the orchestrator application 115 and the subsidiary application 142 can utilize the resource metadata 139, along with the action configurations 130 to estimate an amount of utilization of computer resources that would be used to perform an action defined in the action configurations 130.

The subsidiary computing environment 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the subsidiary computing environment 106 can employ a plurality of computing devices that can be arranged in one or more server banks or computer banks or other arrangements. Such computing devices can be located in a single installation or can be distributed among many different geographical locations. For example, the subsidiary computing environment 106 can include a plurality of computing devices that together can include a hosted computing resource, a grid computing resource, or any other distributed computing arrangement. In some cases, the subsidiary computing environment 106 can correspond to an elastic computing resource where the allotted capacity of processing, network, storage, or other computing-related resources can vary over time.

Various applications or other functionality can be executed in the subsidiary computing environment 106. The components executed on the subsidiary computing environment 106 include a subsidiary application 142, a resource manager 118b, and other applications, services, processes, systems, engines, or functionality not discussed in detail herein. The resource manager 118b can be executed in a similar manner to the resource manager 118a, as previously described.

The subsidiary application 142 can be executed to receive events from the event hub 109, provision and/or allocate computing resources to perform an action to amend the machine-readable instructions to utilize the computing resources, execute the machine-readable instructions to generate action result data 136, and transfer data to and from other computing environments (e.g., the orchestrator computing environment 103, a subsidiary computing environment 106, etc.), as well as various other tasks. Various examples of the functionality that can be performed by the subsidiary application 142 will be further discussed in the discussion of FIG. 3.

Also, various data is stored in a subsidiary data store 145 that is accessible to the subsidiary computing environment 106. The subsidiary data store 145 can be representative of a plurality of subsidiary data stores 145, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the subsidiary data store 145 is associated with the operation of the various applications or functional entities described below. This data can include action result data 136b, resource metadata 139b, and potentially other data. The action result data 136b is previously described in the discussion of action result data 136a. The resource metadata 139b is previously described in the discussion of resource metadata 139a.

The event hub 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the event hub 109 can employ a plurality of computing devices that can be arranged in one or more server banks or computer banks or other arrangements. Such computing devices can be located in a single installation or can be distributed among many different geographical locations. For example, the event hub 109 can include a plurality of computing devices that together can include a hosted computing resource, a grid computing resource, or any other distributed computing arrangement. In some cases, the event hub 109 can correspond to an elastic computing resource where the allotted capacity of processing, network, storage, or other computing-related resources can vary over time.

Various applications or other functionality can be executed in the event hub 109. The components executed on the event hub 109 include the event service 148, and other applications, services, processes, systems, engines, or functionality not discussed in detail herein.

The event service 148 can be executed to receive, send, and/or relay events to computing environments (e.g., the orchestrator computing environment 103, a subsidiary computing environment 106, etc.). In some embodiments, the event service 148 can be configured as a publication/subscription (pub/sub) message/event broker, such that the event service 148 loosely couples the various computing environments (e.g., the orchestrator computing environment 103, a subsidiary computing environment 106, etc.) together. In at least one embodiment, the event service 148 can provide webhooks or an application programming interface (API) that allows computing environments to publish events or subscribe to receive certain events. Upon receiving an event, the event service 148 can store a copy of the event and send the event to computing environments (e.g., the orchestrator computing environment 103, a subsidiary computing environment 106, etc.) that are subscribed to the specific event. Accordingly, the event service 148 can be said to broadcast events to various computing environments (e.g., the orchestrator computing environment 103, a subsidiary computing environment 106, etc.). In at least another embodiment, the event service 148 can more tightly couple the various computing environments (e.g., the orchestrator computing environment 103, a subsidiary computing environment 106, etc.), where the events can include a specific identifier to identify the computing environments 106 (e.g., the orchestrator computing environment 103, a subsidiary computing environment 106, etc.) that should receive the events.

Next, a general description of the operation of the various components of the network environment 100 is provided. To begin, the orchestrator application 115 can obtain action configurations 130 that specify one or more actions to perform. The orchestrator application 115 can then obtain resource metadata from one or more subsidiary computing environments 106 to estimate the computing resource utilization amounts. Based on the estimate of computing resource utilization amounts, the orchestrator application 115 can allocate or provision one or more computing resources for the one or more actions defined in the action configurations 130. The orchestrator application 115 can then generate machine-readable instructions that are configured to perform the one or more actions based at least in part on the action configurations 130 using the translator 121. In some embodiments, a security module 124 of the orchestrator application 115 can obtain, receive, or identify security configurations 133 that must be followed. The orchestrator application 115 can amend, modify, or include additional machine-readable instructions into the previously generated machine-readable instructions to perform the one or more actions to ensure that security protocols are followed. The orchestrator application 115 can then send a first event to the event service 148 indicating that one or more actions need to be performed. The first event can include the machine-readable instructions to perform the one or more actions.

The event service 148 can send the event to a subsidiary application 142. The subsidiary application can provision or allocate one or more computing resources to perform the one or more actions with the machine-readable instructions. The subsidiary application 142 can amend the machine-readable instructions to utilize the provisioned or allocated computing resources upon execution. The subsidiary application 142 can then execute the machine-readable instructions to generate action result data 136. The subsidiary application 142 can send a second event to the event service 148 to indicate the status of the execution of the machine-readable instructions. In at least one embodiment, the status of the execution is when the execution of the machine-readable instructions has completed.

The event service 148 can send the second event to the orchestrator application 115 to indicate the status of the execution of the machine-readable instructions. In at least one embodiment, the orchestrator application 115 can send a third event to the event service 148 directing the subsidiary application 142 to transfer the action result data 136 that resulted from the execution of the machine-readable instructions to another computing environment (e.g., the orchestrator computing environment 103, another subsidiary computing environment 106, etc.). the event service 148 can send the third event to the subsidiary application 142. The subsidiary application 142 can then send or otherwise transfer the action result data 136 to another computing environment (e.g., the orchestrator computing environment 103, another subsidiary computing environment 106, etc.). The other computing environment (e.g., the orchestrator computing environment 103, another subsidiary computing environment 106, etc.) can then store the action result data for use in developing various unit tests, business analysis, or various other purposes.

In at least another embodiment, the orchestrator application 115 can initiate the execution of a second action of the one or more actions by sending another event to the event service 148 which is ultimately received by a subsidiary application 142. The subsidiary application 142 can again provision computer resources, amend the machine-readable instructions, execute the machine instructions, and ultimately transfer the action result data 136 from performing the second action of the one or more actions. The process can repeat until each of the actions of the one or more actions has completed.

Figure 2:
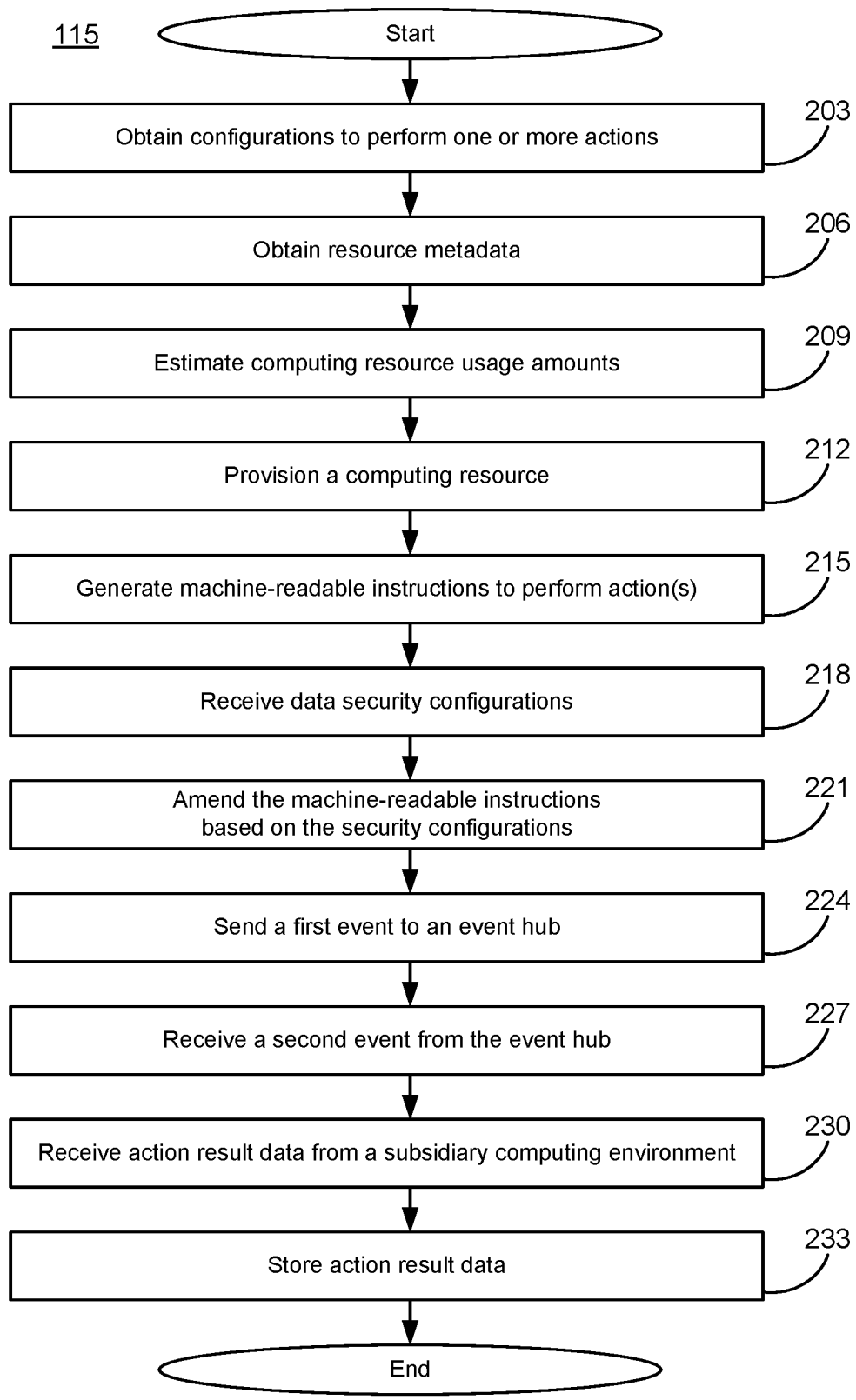
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the orchestrator application 115. The flowchart of FIG. 2 provides merely an example of the many different types of functional arrangements that can be employed to implement the operation of the depicted portion of the orchestrator application 115. As an alternative, the flowchart of FIG. 2 can be viewed as depicting an example of elements of a method implemented within the network environment 100.

Beginning with block 203, the orchestrator application 115 can obtain or receive a request that includes action configurations 130. The action configurations 130 can represent a workflow of one or more actions that can be performed over a computing environment (e.g., the orchestrator computing environment 103, another subsidiary computing environment 106, etc.). The action configurations 130 can function as a "no-code" way to instruct various computing environments to perform one or more actions to yield action result data 136. By "no-code," it should be understood that a user will merely provide configuration information and the combination of the orchestrator application 115, the event service 148, and the subsidiary computing environment(s) 106 can execute the actions without code being provided within the action configurations 130. For example, action configurations 130 can include an action that would select information as action result data 136 from a secure database held "on premises." The action configurations 130 could also include an action to transfer action result data 136 from one computing environment to another computing environment. The action configurations 130 can also include an action that would perform calculations on large data sets and return the action result data 136. In some embodiments, the actions in the action configurations 130 could be unaware of which computing environment (e.g., the orchestrator computing environment 103, another subsidiary computing environment 106, etc.) are capable of storing certain data or performing certain calculations. In such embodiments, a translator 121 can determine which computing environment (e.g., the orchestrator computing environment 103, another subsidiary computing environment 106, etc.) would be responsible for performing such an action.

Next, at block 206, the orchestrator application 115 can obtain or receive resource metadata 139. In at least one embodiment, the orchestrator application 115 can obtain or receive the resource metadata 139 from one or more subsidiary computing environments 106. In some embodiments, the orchestrator application 115 can obtain or receive the resource metadata 139 from one or more orchestrator computing environments 103. The resource metadata 139 can represent information about the computing resources that are accessible to a computing environment (e.g., the orchestrator computing environment 103, a subsidiary computing environment 106, etc.). For example, the resource metadata 139 can identify an operating system of the computing environment, the file system, and/or the available services. In at least some embodiments, the resource metadata 139 can also include hardware or virtualized hardware accessible to the computing environment, such as a memory, processors, data storage devices (e.g., disk drives, solid state drives, etc.), network adapters, and various other hardware or virtualized hardware. Additionally, the resource metadata 139 can also include various information about the utilization of any of the aforementioned computing resources. For example, the resource metadata 139 can identify the utilization amount of a hard drive that is allocated for a relational database or another service. In another example, the resource metadata 139 can include the average processor utilization amounts for the computing environment. Additionally, the resource metadata 139 can also include minimum data size allocation information to store a specific data type. For example, the resource metadata 139 can include information that identifies that each user requires a minimum of five kilobytes of data storage to be allocated to ensure that the data transfer will complete.

Continuing to block 209, the orchestrator application 115 can estimate computing resource utilization to obtain, receive, store, and/or maintain the action result data 136 that would result from performing at least one of the one or more actions. Computing resources can include memory, processors, data storage (e.g., hard drive, solid-state drive, Universal Serial Bus (USB) flash drive, memory card, etc.), network devices, or various other computer components that can be used to execute machine-readable instructions, store the result of the machine-readable instructions, and/or transfer the result of the machine-readable instructions. In at least some embodiments, the orchestrator application 115 can estimate the computing resources based at least in part on the action configurations 130 received at block 203. Additionally, the orchestrator application 115 can estimate the computing resource utilization amount based at least in part on the resource metadata 139 received at block 206.

Next, at block 212, the orchestrator application 115 can allocate or provision computing resources to aid in the execution of the one or more actions. The orchestrator application 115 can communicate with the resource manager 118a on the orchestrator computing environment 103 to allocate or provision specific resources. In at least some embodiments, the orchestrator application 115 can allocate or provision based at least in part on the estimated computing resources from block 209. Examples of allocating or provisioning computing resources can include allocating data storage space that is capable of storing action result data 136 once the actions have been completed. The orchestrator application 115 can allocate or provision computing resources on various computing environments, such as the orchestrator computing environment 103, one or more subsidiary computing environments 106, or another computing environment connected over the network 112.

Continuing to block 215, the orchestrator application 115 can generate machine-readable instructions that, when executed, can cause a computing environment (e.g., the orchestrator computing environment 103, a subsidiary computing environment 106, etc.) to perform one or more of the one or more actions. The orchestrator application 115 can generate the machine-readable instructions based at least in part on the action configurations 130 received at block 203. In at least some embodiments, the orchestrator application 115 can leave placeholders within the machine-readable instructions so that a subsidiary computing environment 106 can personalize the machine-readable instructions based on the computing resources available to that environment. The orchestrator application 115 can utilize a translator 121 to convert the action configurations 130 to machine-readable instructions. In at least one embodiment, the translator 121 can generate a single set of machine-readable instructions to perform all of the one or more actions defined by the action configurations 130. In at least another embodiment, the translator 121 can generate more than one sets of machine-readable instructions, each set performing one or more of the actions defined by the action configurations 130. Because the translator 121 is modular, the orchestrator application 115 can be expanded to translate new styles of action configurations 130 by including additional translators 121 within the orchestrator application 115.

Next, at block 218, the orchestrator application 115 can obtain or receive data security configurations 133. The security configurations 133 can represent rules or procedures to ensure that data remains secure during the performance of the actions. For example, the security configurations 133 could include rules that require a computing environment to perform a lock on a database before queries are executed. In at least another example, the security configurations 133 could require that information received or calculated be encrypted using one or more secure keys or secure certificates. In at least another example, the security configurations 133 could require that certain protocols be followed to ensure a secure transfer of data between one computing environment to another computing environment, such as joining a virtual private network (VPN) to communicate between the computing environments. In yet another example, the security configurations 133 could include instructions to perform scans on data received from another computing environment. In at least one embodiment, the action configurations 130 can be stored as a JavaScript Object Notation (JSON) file. In at least another embodiment, the action configurations 130 can be stored as an Extensible Markup Language (XML) file. Various files and formats for the action configurations 130 can also be used.

Continuing to block 221, the orchestrator application 115 can amend or modify the machine-readable instructions. The security module 124 of the orchestrator application 115 can determine which portions of the machine-readable instructions should be amended, modified, and/or injected with additional instructions to bring the machine-readable instructions in compliance. To do so, the security module 124 can identify the portions of the machine-readable instructions that correspond to the security configurations 133. For example, if a security configuration 133 existed to perform a security action prior to executing a data query, the security module of the orchestrator application 115 could search the machine-readable instructions for a data query, and subsequently amend or modify the machine-readable instructions to perform the security action.

Next, at block 224, the orchestrator application 115 can send a first event to an event service 148. In some embodiments, the first event can include the machine-readable instructions. In other embodiments, the machine-readable instructions can be stored in the orchestrator data store 127 and the subsidiary computing environments 106 could obtain the machine-readable instructions at a later point. The first event can indicate to the event service 148 that the orchestrator application 115 should inform the subsidiary computing environments 106 that one or more actions are to be performed.

Continuing to block 227, the orchestrator application 115 can receive a second event from the event service 148. The second event can include at least an execution status of the subsidiary computing environment 106 with respect to performing at least one of the one or more actions. In at least one embodiment, the execution status can represent that the subsidiary computing environment 106 has completed the performance of at least one of the one or more tasks. In some embodiments, the execution status can represent the progress to the completion of the performance of the action. The progress can be represented as a percentage, a decimal value, or a time (e.g., a time since it has started or a countdown to completion).

Next, at block 230, the orchestrator application 115 can receive or obtain the action result data 136 from a subsidiary computing environment 106. In at least one embodiment, the subsidiary computing environment 106 can transfer action result data 136 to another computing device, such as the orchestrator computing environment 103. Accordingly, the orchestrator application 115 can receive the action result data 136. The action result data 136 can represent the result of the subsidiary computing environments 106 performing one or more actions as defined by and translated from the action configurations 130. The action result data 136 can be calculated data or data stored on a subsidiary computing environment 106.

Continuing to block 233, the orchestrator application 115 can store the action result data 136. In at least one embodiment, the orchestrator application 115 can store the action result data 136 in the orchestrator data store 127. In at least another embodiment, the orchestrator application 115 can store the action result data 136 in an allocated computing resource that was allocated or provisioned in block 212.

In at least one embodiment, the process of blocks 215-233 can repeat until each of the one or more actions has been performed. In such an embodiment, one or more sets of machine-readable instructions can be generated and sent to the event hub 109, which would subsequently be sent to subsidiary application 142 for execution. In at least another embodiment, the process of blocks 224-233 can repeat until each of the one or more actions has been performed. In such an embodiment, the machine-readable instructions can be configured to perform the one or more actions based at least in part on an identifier sent to the subsidiary application 142 that identifies which action the subsidiary application 142 should perform. Subsequently, the process depicted in the flowchart of FIG. 2 can end.

Figure 3:
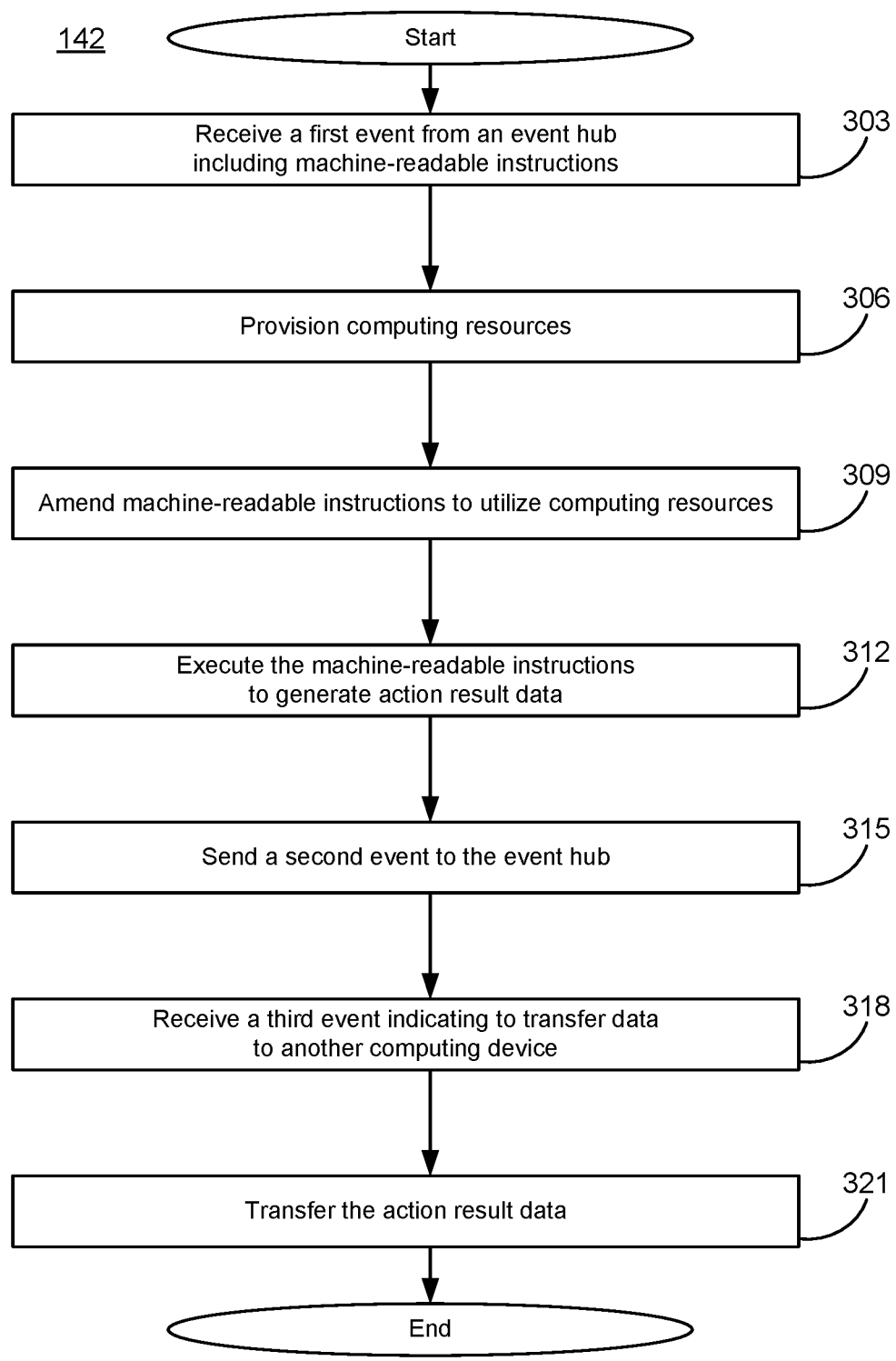
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the subsidiary application 142. The flowchart of FIG. 3 provides merely an example of the many different types of functional arrangements that can be employed to implement the operation of the depicted portion of the subsidiary application 142. As an alternative, the flowchart of FIG. 3 can be viewed as depicting an example of elements of a method implemented within the network environment 100.

Beginning with block 303, the subsidiary application 142 can receive a first event from an event service 148. The first event can indicate to the subsidiary application to perform one or more of the one or more actions previously discussed in the discussion of FIG. 2. In at least some embodiments, the first event can include machine-readable instructions to perform at least one of the one or more actions. In at least another embodiment, the first event can include an identifier for the actions stored in the orchestrator data store 127. In such an embodiment, the subsidiary application 142 can obtain the machine-readable instructions based on the identifier. In some embodiments, the first event can indicate which action, if any, to perform. For instance, the first event could include that a specific subsidiary application 142 should perform a first action, but not a second action in the one or more actions. In another example, the first event could describe the environment that can perform an action. For instance, the first event could describe an environment that is hosted on a cloud service (e.g., Amazon® Web Services (AWS), Microsoft® Azure®, Google® Cloud Platform, etc.) that is running a datastore that retains certain types of data.

Next, at block 306, the subsidiary application 142 can provision or allocate computing resources to perform an action of the one or more actions. The subsidiary application 142 can communicate with the resource manager 118*b* on the subsidiary computing environment 106 to provision or allocate specific resources. Examples of allocating or provisioning computing resources can include allocating data storage space that is capable of storing action result data 136 once the actions have been completed. The subsidiary application 142 can allocate or provision computing resources on various computing environments, such as the orchestrator computing environment 103, one or more subsidiary computing environments 106, or another computing environment connected over the network 112.

Continuing to block 309, the subsidiary application 142 can modify the machine-readable instructions to utilize the computing resources to perform the action of the one or more actions. In some embodiments, the subsidiary application 142 can modify the machine-readable instructions to utilize the computing resources that were provisioned or allocated in block 306. In at least one embodiment, the subsidiary application 142 can modify the machine-readable instructions to utilize at least one computing resource that were provisioned or allocated in block 212 of FIG. 2. The subsidiary application 142 can identify the placeholders that were generated at block 215 of FIG. 2 to modify or amend such placeholders with the subsidiary computing environment 106 specific computing resources. In at least one embodiment, the resource manager 118b can identify various computing resources of the subsidiary computing environment 106 that can be used in the machine-readable instructions.

Next, at block 312, the subsidiary application 142 can execute the machine-readable instructions. In at least one embodiment, the subsidiary application 142 can execute the machine-readable instructions, such that only a single action of the one or more actions is performed. In at least another embodiment, the subsidiary application 142 can execute the machine-readable instructions, such that more than one of the actions are performed. As a result of the execution of the machine-readable instructions, action result data 136 can be created. For instance, if the action were to select data from a data store, the action result data 136 would represent the selected data.

Continuing to block 315, the subsidiary application 142 can send a second event to the event hub 109. The second event can indicate the progress of the performance of an action of the one or more actions. In at least some embodiments, the subsidiary application 142 can send the second event to the event hub 109 in response to an action being completed. In at least another embodiment, the subsidiary application 142 can send the second event to indicate the progress of completing at least one action in the one or more actions. In some embodiments, the process of blocks 303 to 315 can repeat for each event received from the event service 148. In at least some embodiments, the one or more processes of blocks 303 to 315 can be performed in parallel execution or concurrent execution. In at least some embodiments, the one or more processes of blocks 303 to 315 can be executed in sequence.

Next, at block 318, the subsidiary application 142 can receive a third event from the event service 148. The third event can indicate that a transfer of the action result data 136 to another computing environment (e.g., the orchestrator computing environment 103, a subsidiary computing environment 106, etc.) should be performed. Continuing to block 321, the subsidiary application 142 can then transfer the action result data 136. Upon complete transfer of the action result data 136 to a computing environment (e.g., the orchestrator computing environment 103, a subsidiary computing environment 106, etc.), the process depicted in the flowchart of FIG. 3 can come to an end.

Moving on to FIG. 4, shown is a sequence diagram that provides one example of the interactions between the orchestrator data store 127, the orchestrator application 115, the event service 148, and the subsidiary application 142. The sequence diagram of FIG. 4 provides merely an example of the many different types of functional arrangements that can be employed by the orchestrator data store 127, the orchestrator application 115, the event service 148, and the subsidiary application 142. As an alternative, the sequence diagram of FIG. 4 can be viewed as depicting an example of elements of a method implemented within the network environment 100.

To begin, the orchestrator application 115 can obtain or receive a request that includes action configurations 130, as previously described in block 203 of FIG. 2. Next, the orchestrator application 115 can obtain or receive resource metadata 139, as previously described in block 206 of FIG. 2. Next, the orchestrator application 115 can estimate computing resource utilization to obtain, receive, store, and/or maintain the action result data 136 that would result from performing at least one of the one or more actions (See block 209 of FIG. 2). Next, the orchestrator application 115 can allocate or provision computing resources to aid in the execution of the one or more actions, as previously described in the discussion of block 212 of FIG. 2. Next, the orchestrator application 115 can generate machine-readable instructions that, when executed, can cause a computing environment (e.g., the orchestrator computing environment 103, a subsidiary computing environment 106, etc.) to perform one or more of the one or more actions, as previously described in the discussion of block 215 of FIG. 2. Next, the orchestrator application 115 can obtain or receive security configurations 133, as previously described in the discussion of block 218 of FIG. 2. Next, the orchestrator application 115 can amend or modify the machine-readable instructions, as previously described in the discussion of block 221 of FIG. 2. Next, the orchestrator application 115 can send a first event to an event service 148, as previously described in the discussion of block 224 of FIG. 2.

Next, the subsidiary application 142 can receive the first event from an event service 148, as previously described in the discussion of block 303 of FIG. 3. Next, the subsidiary application 142 can provision or allocate computing resources to perform an action of the one or more actions, as previously described in the discussion of block 306 of FIG. 3. Next, the subsidiary application 142 can modify the machine-readable instructions to utilize the computing resources to perform the action of the one or more actions, as previously described in the discussion of block 309 of FIG. 3. Next, the subsidiary application 142 can execute the machine-readable instructions, as previously described in the discussion of block 312 of FIG. 3. Next, the subsidiary application 142 can send a second event to the event hub 109, as previously described in the discussion of block 315 of FIG. 3.

Next, the orchestrator application 115 can receive a second event from the event service 148, as previously described in the discussion of block 227 of FIG. 2. Next, the subsidiary application 142 can receive a third event from the event service 148, as previously described in the discussion of block 318 of FIG. 3. Next, the subsidiary application 142 can then transfer the action result data 136, as previously described in the discussion of block 321 of FIG. 3. Next, the orchestrator application 115 can receive or obtain the action result data 136 from a subsidiary computing environment 106, as previously described in the discussion of block 230 of FIG. 2. Next, the orchestrator application 115 can store the action result data 136, as previously described in the discussion of block 233 of FIG. 2. Subsequently, the processed depicted in the sequence diagram of FIG. 4 can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagram show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagram show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagram can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment, such as the orchestration computing environment 103 and/or a subsidiary computing environment 106.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a first computing device comprising a processor and a memory; and
    a first set of machine-readable instructions stored in the memory that, when executed by the processor, cause the first computing device to at least:
        receive a request comprising configurations to perform one or more actions;
        generate, based at least in part on the configurations to perform the one or more actions, a second set of machine-readable instructions that, when executed, cause a second computing device to perform a first action;
        send a first event to an event hub, the first event comprising the second set of machine-readable instructions; and
        receive a second event from the event hub, the second event comprising an execution status of the second computing device.

2. The system of claim 1, wherein the first set of machine-readable instructions further cause the first computing device to at least:
    estimate, based at least in part on the configurations to perform the one or more actions, an estimated data storage amount for storing a result of the one or more actions; and
    allocate, based at least in part on the estimated data storage amount, data storage space in a data store.

3. The system of claim 2, wherein the second event indicates that the second computing device has prepared data to send to the first computing device and the first set of machine-readable instructions further cause the first computing device to at least:
    receive the prepared data from the second computing device; and
    store the prepared data in the data storage space in the data store.

4. The system of claim 2, wherein:
    the first set of machine-readable instructions further cause the first computing device to at least obtain resource metadata from the second computing device, the resource metadata comprising a single record size; and
    the first set of machine-readable instructions that estimate the estimated data storage amount for storing the result of the one or more actions, when executed by the processor, further cause the first computing device to estimate the estimated data storage amount based at least in part on the single record size in the resource metadata.

5. The system of claim 2, wherein:
    the second event indicates that the second computing device has prepared data by executing the second set of machine-readable instructions;
    the data store is hosted on a third computing device; and
    the first set of machine-readable instructions, when executed by the processor, further cause the first computing device to at least:
        generate, based at least in part on the configurations to perform the one or more actions, a third set of machine-readable instructions that, when executed, cause the third computing device to perform a second action;
        send, in response to receiving the second event from the event hub, a third event to the event hub to direct the second computing device to transfer the prepared data to the data store on the third computing device;
        receive a fourth event from the event hub indicating that the transfer of the prepared data to the data store on the third computing device has been completed; and
        send, in response to receiving the fourth event from the event hub, a fifth event to the event hub, the fifth event comprising the third set of machine-readable instructions.

6. The system of claim 1, wherein the first set of machine-readable instructions, when executed by the processor, further cause the first computing device to at least:
    generate, based at least in part on the configurations to perform the one or more actions, a third set of machine-readable instructions that, when executed, cause a third computing device to perform a second action; and
    send, prior to receiving the second event from the event hub, a third event to the event hub, the third event comprising the third set of machine-readable instructions.

7. The system of claim 1, wherein the first set of machine-readable instructions further cause the first computing device to at least:
    receive data security configurations; and
    amend the second set of machine-readable instructions to include additional instructions based at least in part on the data security configurations.

8. A non-transitory, computer-readable medium comprising a first set of machine-readable instructions that, when executed by a processor of a first computing device, cause the first computing device to at least:
    receive a first event from an event hub, the first event comprising a second set of machine-readable instructions to perform one or more actions;
    provision computing resources to perform a first action of the one or more actions;
    modify the second set of machine-readable instructions to utilize the computing resources to perform the first action of the one or more actions;
    execute the second set of machine-readable instructions; and
    send, in response to the first action being completed, a second event to the event hub, the second event indicating that the first action of the one or more actions has completed.

9. The non-transitory, computer-readable medium of claim 8, wherein:
the computing resources are a first set of computing resources; and
the first set of machine-readable instructions further cause the first computing device to at least:
provision a second set of computing resources to perform a second action of the one or more actions;
modify the second set of machine-readable instructions to utilize the provisioned computing resources to perform the second action of the one or more actions; and
send, in response to the second action being completed, a third event to the event hub, the third event indicating that the first action of the one or more actions has completed.

10. The non-transitory, computer-readable medium of claim 9, wherein the second set of machine-readable instructions are configured to concurrently perform the first action and the second action.

11. The non-transitory, computer-readable medium of claim 9, wherein the first set of machine-readable instructions that execute the second set of machine-readable instructions are executed in response to receiving the third event, the third event indicating that the first action is to be performed.

12. The non-transitory, computer-readable medium of claim 11, wherein the first set of machine-readable instructions further cause the first computing device to at least execute, in response to receiving a fourth event, the second set of machine-readable instructions to perform the second action, the fourth event indicating that the second action is to be performed.

13. The non-transitory, computer-readable medium of claim 8, wherein the processor is a first processor and the computing resources include at least one of a second processor, a memory, or a data storage device.

14. A method, comprising:
receiving, by a first computing device, a request comprising configurations to perform one or more actions;
generating, by the first computing device based at least in part on the configurations to perform the one or more actions, a first set of machine-readable instructions that, when executed by a second computing device, cause the second computing device to perform a first action;
sending, by the first computing device, a first event to an event hub, the first event comprising the first set of machine-readable instructions; and
receiving, by the first computing device, a second event from the event hub, the second event comprising an execution status of the second computing device.

15. The method of claim 14, further comprising:
estimating, by the first computing device based at least in part on the configurations to perform the one or more actions, an estimated data storage amount for storing a result of the one or more actions; and
allocating, by the first computing device based at least in part on the estimated data storage amount, data storage space in a data store.

16. The method of claim 15, wherein the second event indicates that the second computing device has prepared data to send to the first computing device and the method further comprises:
receiving, by the first computing device, the prepared data from the second computing device; and
storing, by the first computing device, the prepared data in the data storage space in the data store.

17. The method of claim 15, further comprising:
obtaining, by the first computing device, resource metadata from the second computing device, the resource metadata comprising a single record size; and
wherein estimating the estimated data storage amount for storing the result of the one or more actions is further based at least in part on the single record size in the resource metadata.

18. The method of claim 15, wherein:
the second event indicates that the second computing device has prepared data by executing the first set of machine-readable instructions;
the data store is hosted on a third computing device; and
the method further comprises:
generating, by the first computing device based at least in part on the configurations to perform the one or more actions, a second set of machine-readable instructions that, when executed, cause the third computing device to perform a second action;
sending, by the first computing device in response to receiving the second event from the event hub, a third event to the event hub to direct the second computing device to transfer the prepared data to the data store on the third computing device;
receiving, by the first computing device, a fourth event from the event hub indicating that the transfer of the prepared data to the data store on the third computing device has been completed; and
sending, by the first computing device, in response to receiving the fourth event from the event hub, a fifth event to the event hub, the fifth event comprising the second set of machine-readable instructions.

19. The method of claim 14, further comprising:
generating, by the first computing device based at least in part on the configurations to perform the one or more actions, a second set of machine-readable instructions that, when executed, cause a third computing device to perform a second action; and
sending, by the first computing device prior to receiving the second event from the event hub, a third event to the event hub, the third event comprising the second set of machine-readable instructions.

20. The method of claim 14, further comprising:
receiving, by the first computing device, data security configurations; and
amending, by the first computing device, a second set of machine-readable instructions to include additional instructions based at least in part on the data security configurations.

* * * * *